US006448925B1

(12) United States Patent
Shridhara

(10) Patent No.: US 6,448,925 B1
(45) Date of Patent: Sep. 10, 2002

(54) JAMMING DETECTION AND BLANKING FOR GPS RECEIVERS

(75) Inventor: Kudhrethaya A. Shridhara, Irvine, CA (US)

(73) Assignee: Conexant Systems, Inc., Newport, CA (US)

(*) Notice: Subject to any disclaimer, the term of this patent is extended or adjusted under 35 U.S.C. 154(b) by 0 days.

(21) Appl. No.: 09/244,354

(22) Filed: Feb. 4, 1999

(51) Int. Cl.$^7$ ................................................. G01S 1/00
(52) U.S. Cl. ............................... 342/357.02; 342/357.12
(58) Field of Search ........................ 342/357.14, 357.12, 342/357.06, 357.03, 357.02, 16, 14, 362; 701/214

(56) References Cited

U.S. PATENT DOCUMENTS

| 3,604,911 A | 9/1971 | Schmitt ..................... 235/181 |
| 3,975,628 A | 8/1976 | Graves et al. .............. 250/199 |
| 4,426,712 A | 1/1984 | Gorski-Popiel ............. 375/96 |
| 4,445,118 A | 4/1984 | Taylor et al. ............... 343/357 |
| 4,463,357 A | 7/1984 | MacDoran .................. 343/460 |
| 4,578,678 A | 3/1986 | Hurd .......................... 343/357 |
| 4,667,203 A | 5/1987 | Counselman, III .......... 342/357 |
| 4,701,934 A | 10/1987 | Jasper ........................ 375/1 |
| 4,754,465 A | 6/1988 | Trimble ...................... 375/1 |
| 4,785,463 A | 11/1988 | Janc et al. .................. 375/1 |
| 4,809,005 A | 2/1989 | Counselman, III .......... 342/352 |
| 4,821,294 A | 4/1989 | Thomas, Jr. ................. 375/96 |
| 4,890,233 A | 12/1989 | Ando et al. |
| 4,894,662 A | 1/1990 | Counselman ............... 342/357 |
| 4,894,842 A | 1/1990 | Broekhoven et al. ........ 375/1 |
| 4,992,720 A | 2/1991 | Hata ........................... 320/23 |
| 4,998,111 A | 3/1991 | Ma et al. .................... 342/352 |
| 5,014,066 A | 5/1991 | Counselman, III .......... 342/352 |
| 5,018,088 A | 5/1991 | Higbie |
| 5,036,329 A | 7/1991 | Ando .......................... 342/357 |
| 5,043,736 A | 8/1991 | Darnell et al. .............. 342/357 |

(List continued on next page.)

FOREIGN PATENT DOCUMENTS

| EP | 0639901 A2 | 2/1995 |
| EP | 0639901 A3 | 11/1998 |
| JP | 08/065205 A | 3/1996 |
| WO | WO 92/13392 | 8/1992 |
| WO | WO 00/19644 | 4/2000 |

OTHER PUBLICATIONS

Lee, Receiver Autonomus Integrity Monitoring (RAIM) Capability for Sol–Means GPS Navigation in the Oceanic Phase of Flight, Mar. 1992, IEEE, pp 464–472.*

D.J.R. Van Nee and A.J.R.M. Coenen, "New Fast GPS Code–Acquistion Technique Using FFT," Jan. 17, 1991, *Electronics Letters*, vol. 27, No. 2.

Primary Examiner—Daniel T. Pihulic
(74) Attorney, Agent, or Firm—Sonnenschein Nath & Rosenthal

(57) ABSTRACT

GPS satellites broadcast GPS signals with low power transmitters less than 50 watts. Although the GPS broadcast signals are encoded using spread spectrum technology which decreases the effect noise has on the reception of the signal, jamming signals can adversely affect GPS receiver performance. Jamming signals can cause position and velocity indication within the system to be erroneous. These errors can build up within the system and the errors may take a significant time to dissipate even after the jamming signal has gone. These errors can manifest themselves as errors in velocity and errors in position on the order of tens of miles. Methods of detection of the presence of the jamming signal including observing the output of a correlator chain in which the PN code being correlated is delayed in each link in the chain are presented in this disclosure. The present disclosure also proposes countermeasures for dealing with the jamming signal. These methods include shutting off the receiver, and computing the position by alternate methods, such as dead reckoning, during periods in which the jamming signal persists.

51 Claims, 10 Drawing Sheets

U.S. PATENT DOCUMENTS

| | | | |
|---|---|---|---|
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,179,724 A | 1/1993 | Lindoff | 455/76 |
| 5,202,829 A | 4/1993 | Geier | |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A * | 1/1995 | Eldridge | 342/14 |
| 5,379,224 A | 1/1995 | Brown et al. | |
| 5,396,515 A | 3/1995 | Dixon et al. | 375/208 |
| 5,402,346 A | 3/1995 | Lion et al. | |
| 5,402,347 A | 3/1995 | McBurney et al. | |
| 5,410,747 A | 4/1995 | Ohmagari et al. | 455/118 |
| 5,416,712 A | 5/1995 | Geier et al. | |
| 5,418,818 A | 5/1995 | Marchetto et al. | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | |
| 5,498,239 A | 3/1996 | Galel et al. | 604/95 |
| 5,504,684 A | 4/1996 | Lau et al. | |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/18 |
| 5,577,023 A | 11/1996 | Marum et al. | 370/16 |
| 5,577,025 A | 11/1996 | Skinner et al. | 370/22 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A * | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 2/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,150,980 A | 11/2000 | Krasner | 342/357.1 |

* cited by examiner

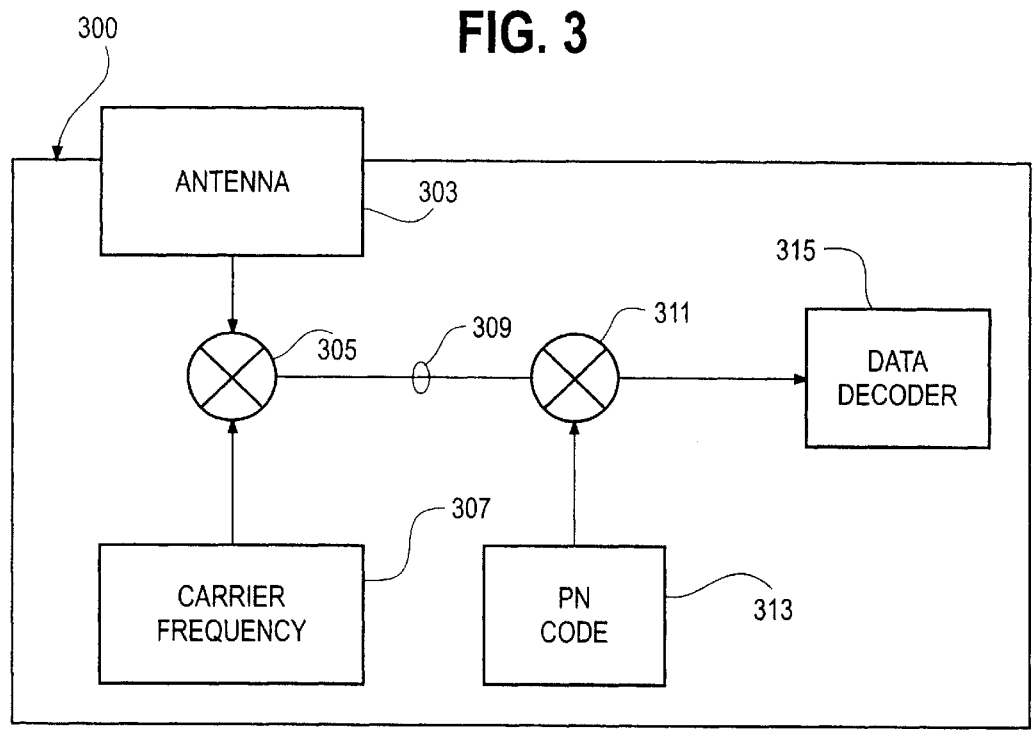

FIG. 4

| | CODE FOR DATA "1" | CODE FOR DATA "0" |
|---|---|---|
| 401 — SPREADING CODE #1 | 11000011 | 00111100 |
| 403 — SPREADING CODE #2 | 00110011 | 11001100 |
| 405 — SPREADING CODE #3 | 10010110 | 01101001 |

407 — CODE FOR DATA "1"; 409 — CODE FOR DATA "0"

| | | | | | | | | |
|---|---|---|---|---|---|---|---|---|
| 411 — DATA "1" TRANSMITTED (CODE #1) | 1 | 1 | -1 | -1 | -1 | -1 | 1 | 1 |
| 413 — MULTIPLY BY SPREADING CODE #1 | 1 | 1 | -1 | -1 | -1 | -1 | 1 | 1 |
| 415 — PRODUCT OF EACH BIT/ TOTAL | 1+ | 1+ | 1+ | 1+ | 1+ | 1+ | 1+ | 1 = +8 |

| | | | | | | | | |
|---|---|---|---|---|---|---|---|---|
| 417 — DATA "0" TRANSMITTED (CODE #1) | -1 | -1 | 1 | 1 | 1 | 1 | -1 | -1 |
| 419 — MULTIPLY BY SPREADING CODE #1 | 1 | 1 | -1 | -1 | -1 | -1 | 1 | 1 |
| 421 — PRODUCT OF EACH BIT/ TOTAL | -1 | -1 | -1 | -1 | -1 | -1 | -1 | -1 = -8 |

| | | | | | | | | |
|---|---|---|---|---|---|---|---|---|
| 423 — DATA "1" TRANSMITTED (CODE #1) | 1 | 1 | -1 | -1 | -1 | -1 | 1 | 1 |
| 425 — MULTIPLY BY SPREADING CODE #2 | -1 | -1 | 1 | 1 | -1 | -1 | 1 | 1 |
| 427 — PRODUCT OF EACH BIT/ TOTAL | -1 | -1 | -1 | -1 | +1 | +1 | +1 | +1 = 0 |

| | | | | | | | | |
|---|---|---|---|---|---|---|---|---|
| 429 — DATA "1" TRANSMITTED (CODE #1) | 1 | 1 | -1 | -1 | -1 | -1 | 1 | 1 |
| 430 — MULTIPLY BY SPREADING CODE #3 | 1 | -1 | -1 | 1 | -1 | 1 | 1 | -1 |
| 433 — PRODUCT OF EACH BIT/ TOTAL | 1+ | -1 | 1+ | -1 | 1+ | -1 | 1+ | -1 = 0 |

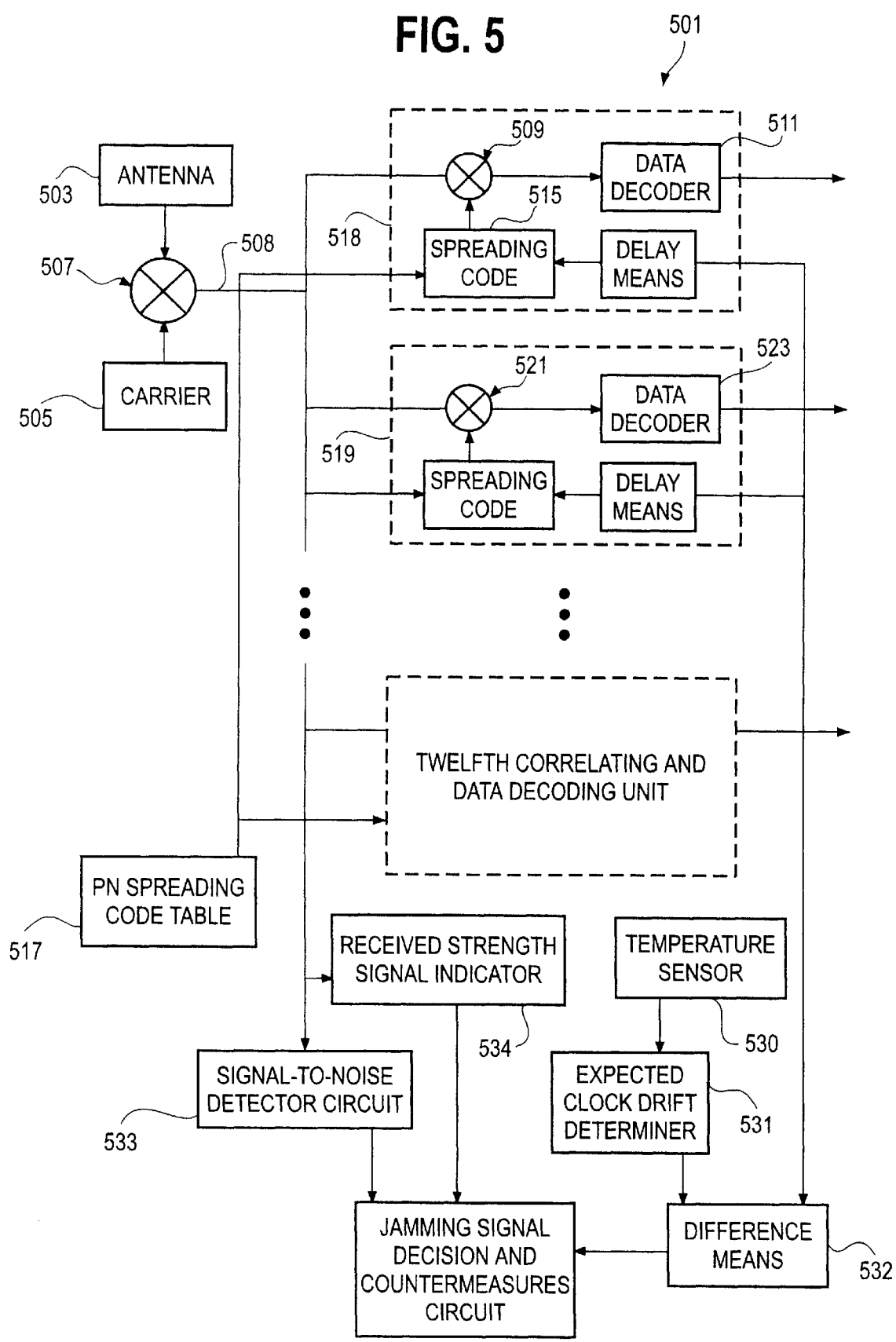

FIG. 6
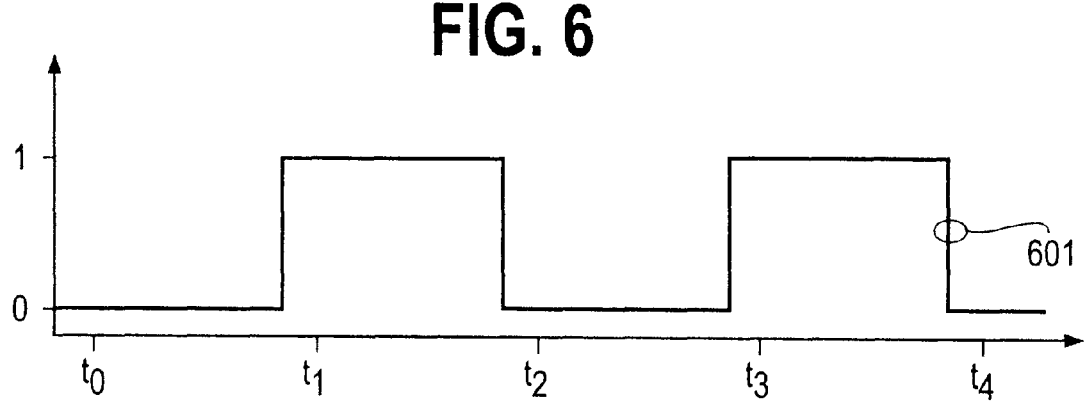
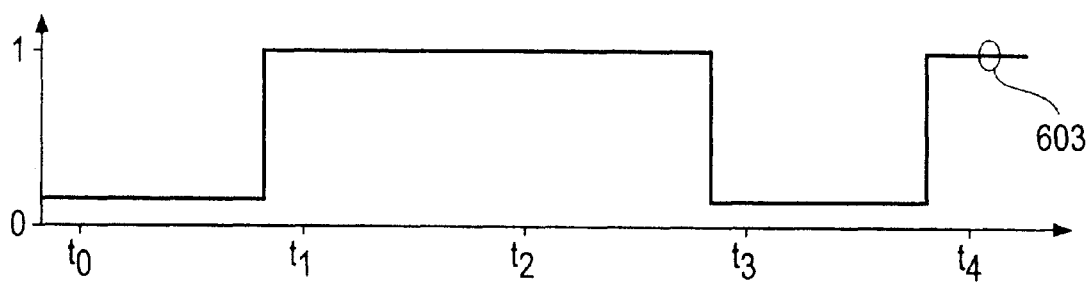
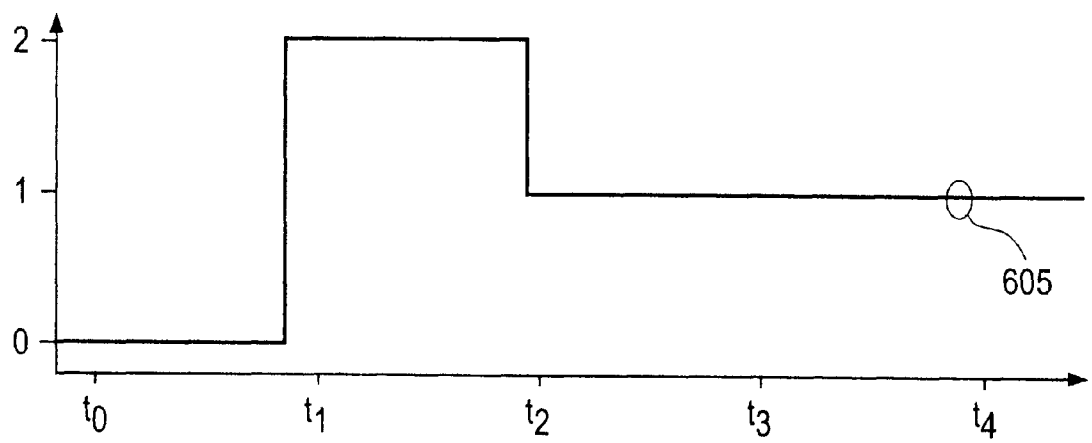
| SIGNAL 3 | $t_0$ | $t_1$ | $t_2$ | $t_3$ | $t_4$ |
|---|---|---|---|---|---|
| VALUE | 0 | 2 | 1 | 1 | 1 |
607

FIG. 7
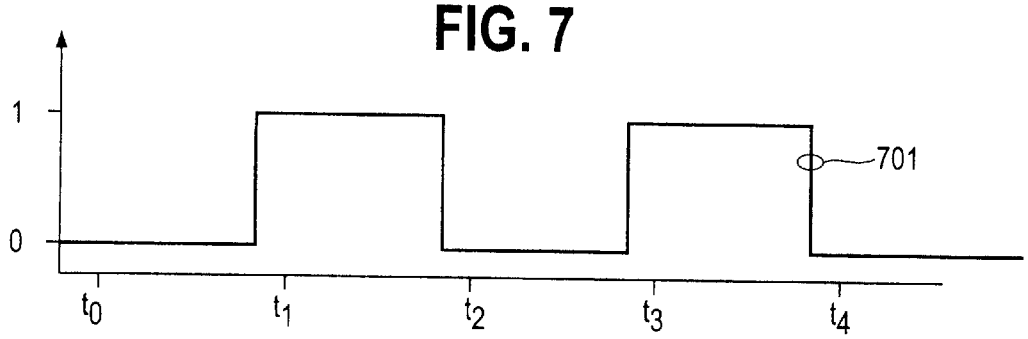
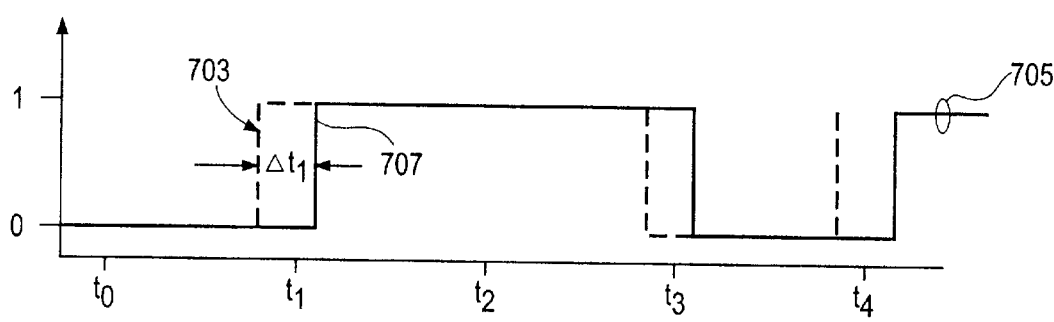
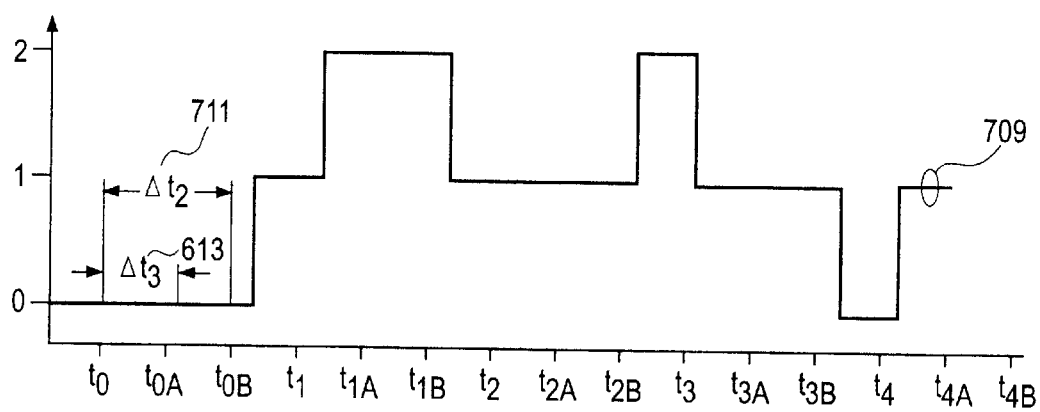
| SIGNAL 6 | $t_0$ | $t_1$ | $t_2$ | $t_3$ | $t_4$ | |
|---|---|---|---|---|---|---|
| VALUE | 0 | 1 | 2 | 2 | 0 | 715 |
| SIGNAL 6 | $t_{0A}$ | $t_{1A}$ | $t_{2A}$ | $t_{3A}$ | $t_{4A}$ | |
|---|---|---|---|---|---|---|
| VALUE | 0 | 2 | 1 | 1 | 1 | 717 |
| SIGNAL 6 | $t_{0B}$ | $t_{1B}$ | $t_{2B}$ | $t_{3B}$ | $t_{4B}$ | |
|---|---|---|---|---|---|---|
| VALUE | 0 | 2 | 1 | 1 | 1 | 719 |

JAMMING DETECTION AND BLANKING FOR GPS RECEIVERS

CROSS-REFERENCE TO RELATED APPLICATION

This application is related to the following co-pending and commonly-assigned patent application Ser. No. 09/244,696, entitled "SPREAD SPECTRUM RECEIVER PERFORMANCE IMPROVEMENT" filed on Feb. 4, 1999 by KUDHRETHAYA A. SHRIDHARA and PAUL A. UNDERBRINK, which is incorporated by reference herein.

FIELD OF THE INVENTION

The present invention relates generally to spread spectrum communications and Global Positioning Systems and, in particular embodiments, to systems, processes and devices which improve the performance of Global Positioning Systems in the presence of jamming signals.

DESCRIPTION OF THE RELATED ART

It is likely that the first navigational system used by man was the sun. It rose in the east and set in the west and as long as travel occurred in daylight hours general direction could be obtained from the sun's position in the sky. With the advent of commerce on the seas it became necessary to ascertain direction at night, and so stellar navigation was born. In order to increase their accuracy, stellar and solar navigation techniques were improved and augmented through the use of maps, charts, and instruments such as the astrolabe and compass. Even augmented by such instruments, stellar and solar navigation was error prone and getting from point A to point B was still, to some extent, a matter of trial and error.

With the advent of radio, and particularly powerful commercial radio stations land based radio direction finding (RDF) came into being. The principle behind RDF is relatively simple. A navigator can tune to a radio station using a directional antenna to find the directional bearing of the radio station. The navigator can then could tune to a second radio station and find the bearing of that station. By knowing the bearing and map location of both stations the navigator's position can be calculated.

Continuing advances in long distance air travel necessitated the ability to guide aircraft accurately. RDF was used to satisfy this requirement and land based beacons were established for the purpose of navigation. These beacons quickly became indispensable to all aviation and to ships as well.

The Global Positioning System (GPS) is also based on radio navigation, a difference being that the beacons are no longer stationary and are no longer land based. The GPS system is a satellite based navigation system having a network of 24 satellites, plus on orbit spares, orbiting the earth 11,000 nautical miles in space, in six evenly distributed orbits. Each satellite orbits the earth every twelve hours.

A prime function of the GPS satellites is to serve as a clock. Each satellite derives its signals from an on board 10.23 MHz Cesium atomic clock. Each satellite transmits a spread spectrum signal with its own individual pseudo noise (PN) code. By transmitting several signals over the same spectrum using distinctly different PN coding sequences the satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the course acquisition code (C/A code). Every 20th cycle the code can change phase and is used to encode a 1500 bit long message which contains an "almanac" containing data on all the other satellites.

There are 32 PN codes designated by the GPS authority. Twenty four of them belong to current satellites in orbit, the 25th PN code is designated as not being assigned to any satellite. The remaining codes are spare codes which may be used in new satellites to replace old or failing units. A GPS receiver may, using the different PN sequences, search the signal spectrum looking for a match. If the GPS receiver finds a match, then it has identified the satellite which has generated the signal.

Ground based GPS receivers may use a variant of radio direction finding (RDF) methodology, called triangulation, in order to determine the position of the ground based GPS receiver. The GPS position determination is different from the RDF technology in that the radio beacons are no longer stationary, they are satellites moving through space at a speed of about 1.8 miles per second as they orbit the earth. By being space based, the GPS system can be used to establish the position of virtually any point on Earth using methods such as triangulation.

The triangulation method depends on the GPS receiving unit obtaining a time signal from a satellite. By knowing the actual time and comparing it to the time that is received from the satellite the receiver, the distance to the satellite can be calculated. If, for example, the GPS satellite is 12,000 miles from the receiver then the receiver must be somewhere on the location sphere defined by the radius of 12,000 miles from that satellite. If the GPS receiver then ascertains the position of a second satellite it can calculate the receiver's location based on a location sphere around the second satellite. The two sphere's intersect and form a circle, and so the GPS receiver must be located somewhere within that location circle. By ascertaining the distance to a third satellite the GPS receiver can project a location sphere around the third satellite. The third satellite's location sphere will then intersect the location circle produced by the intersection of the location spheres of the first two satellites at just two points. By determining the location sphere of one more satellite, whose location sphere will intersect one of the two possible location points, the precise position of the GPS receiver is determined. As a consequence, the exact time may also be determined, because there is only one time offset that can account for the positions of all the satellites. The triangulation method may yield positional accuracy on the order of 30 meters, however the accuracy of GPS position determination may be degraded due to signal strength and multipath reflections.

As many as 11 satellites may be received by a GPS receiver at one time. In certain environments such as a canyon, some satellites may be blocked out, and the GPS position determining system may depend for position information on satellites that have weaker signal strengths, such as satellites near the horizon. In other cases overhead foliage may reduce the signal strength that is received by the GPS receiver unit. In either case the signal strength may be reduced.

There are multiple ways of using radio spectrum to communicate. For example in frequency division multiple access (FDMA) systems, the frequency band is divided into a series of frequency slots and different transmitters are allotted different frequency slots.

In time division multiple access (TDMA) systems, the time that each transmitter may broadcast is limited to a time slot, such that transmitters transmit their messages one after another, only transmitting during their allotted period. With TDMA, the frequency upon which each transmitter transmits may be a constant frequency or may be continuously changing (frequency hopping).

A third way of allotting the radio spectrum to multiple users is through the use of code division multiple access (CDMA) also known as spread spectrum. In CDMA all the users transmit on the same frequency band all of the time. Each user has a dedicated code that is used to separate that user's transmission from all others. This code is commonly referred to as a spreading code, because it spreads the information across the band. The code is also commonly referred to as a Pseudo Noise or PN code. In a CDMA transmission, each bit of transmitted data is replaced by that particular user's spreading code if the data to be transmitted is a "1", and is replaced by the inverse of the spreading, code if the data to be transmitted is "0".

To decode the transmission at the receiver it is necessary to "despread" the code. The despreading process takes the incoming signal and multiplies it by the spreading code and sums the result. This process is commonly known as correlation, and it is commonly said that the signal is correlated with the PN code. The result of the despreading process is that the original data may be separated from all the other transmissions, and the original signal may be recovered. A property of the PN codes that are used in CDMA systems is that the presence of one spread spectrum code does not change the result of the decoding of another code. The property that one code does not interfere with the presence of another code is often referred to as orthogonality, and codes which possess this property are said to be orthogonal.

The process of extracting data from a spread spectrum signal is commonly known by many terms such as correlating, decoding, and despreading. Those terms will be used interchangeably herein.

The codes used by a spread spectrum system are commonly referred to by a variety of terms including, but not limited to, PN (Pseudo Noise) codes, PRC (Pseudo Random Codes), spreading code, despreading code, and orthogonal code. Those terms will also be used interchangeably herein.

It is because CDMA spreads the data across the broadcast spectrum that CDMA is often referred to as spread spectrum. Spread spectrum has a number of benefits. One benefit being that because the data transmitted is spread across the spectrum, spread spectrum can tolerate interference better than some other protocols. Another benefit is that messages can be transmitted with low power and still be decoded, and yet another benefit is that several signals can be received simultaneously with one receiver.

The Global Positioning System (GPS) uses spread spectrum technology to convey its data to ground units. The use of spread spectrum is especially advantageous in the GPS systems. Spread spectrum technology enables GPS receivers to operate on a single frequency, thus saving the additional electronics that would be needed to switch and tune other bands if multiple frequencies were used. Spread Spectrum also minimize power consumption requirements. GPS transmitters for example require 50 watts or less and tolerate substantial interference.

Although the GPS system is available widely, there are conditions which can degrade its performance or block its use. Improvements in the reception of GPS signals are constantly being sought. There is a need for greater sensitivity in receiving GPS signals to improve the performance of ground based receivers.

SUMMARY OF THE DISCLOSURE

Accordingly, preferred embodiments of the present invention are directed to GPS receivers, which employ spread spectrum technology, and systems which employ GPS receivers.

To receive the data a spread spectrum receiver must determine that a PN code is present within the spread spectrum signal. To determine that a PN code is present in a received signal, the received spread spectrum signal must be compared, bit by bit, to the PN code. This process of comparing a signal bit by bit to a PN code is commonly known as correlation. Typically correlators within a GPS unit compare known GPS codes to the received spread spectrum signal to determine the presence of a given GPS signal. The GPS system will look for high outputs from the correlators as an indication that the signal containing a particular PN code (i.e. a signal from a particular GPS satellite) has been found.

Jamming interference from a variety of sources can disrupt the process of finding and decoding GPS signals. When the process of finding and decoding GPS signals is disrupted, errors can occur. These errors may build up if jamming continues. As a result of these, jamming induced, built up errors significant errors in position may occur. These jamming induced errors may persist for long periods of time, up to hours, even after the jamming has ceased.

Several of the preferred embodiments of the disclosure seek to prevent errors in GPS systems related to jamming. These embodiments detect indications that a jamming signal is present and then apply countermeasures to remediate its effects.

There are several methods of detecting that a jamming signal may be present. By applying these methods, alone or together, indications of jamming may be detected. A first method of detecting jamming comprises detecting a rise in the output from a correlator chain within a GPS unit. Normally, if a correlator chain is used to detect a GPS signal, the output of one or more correlators will increase in value indicating that a signal has been detected. A rise in the value of all of the correlators in a chain, however, will indicate the possible existence of a jamming signal. If the rise in the value of all of the correlators in a chain is sudden, that too can indicate the presence of a jamming signal. Another artifact of jamming is that it will appear as a clock drift within the GPS circuit. Clock drift can also be due to temperature. If clock drift is present, and there is not a corresponding increase in temperature, this is an indication that jamming may be present. The signal to noise ratio of the spread spectrum signal received by the GPS system may also be used to help detect jamming. Changes in the signal to noise ratio of the GPS signal are normal occurrences within a GPS system as the system and the GPS satellites being received by the system change position. Changes in signal to noise ratio that are sudden, however, can indicate that a jamming signal is present. Coincidence of more than one indication of jamming also makes it more likely that a jamming signal is present.

After jamming has been detected countermeasures may be applied. These countermeasures may include turning the receiver off until the jamming has ceased. Countermeasures to jamming may also include notifying the user that jamming is present and the readings of the GPS are being supressed by the GPS system or that the position determined may no longer may be reliable. Upon detection of a jamming signal dead reckoning methods may also be applied, in lieu of GPS position determination. GPS positioning may then be restored after the jamming has ceased.

BRIEF DESCRIPTION OF THE DRAWINGS

FIG. 3 is a generalized block diagram representation of a portion of an example GPS receiver;

FIG. 4 is a tabular representation of the spreading and despreading process illustrated with a spreading code of length 8;

FIG. 5 is a block diagram of a detailed representation of an example GPS receiver according to an embodiment of the present invention;

FIG. 6 is a graphical representation of portions of two synchronized spread spectrum signals and their additive result;

FIG. 7 is a graphical representation of portions of two spread spectrum signals which have a phase displacement with respect to each other, and their additive result.

DETAILED DESCRIPTION OF PREFERRED EMBODIMENTS

The first example of a preferred embodiment is one that might be found within a GPS receiver.

Figure 1:
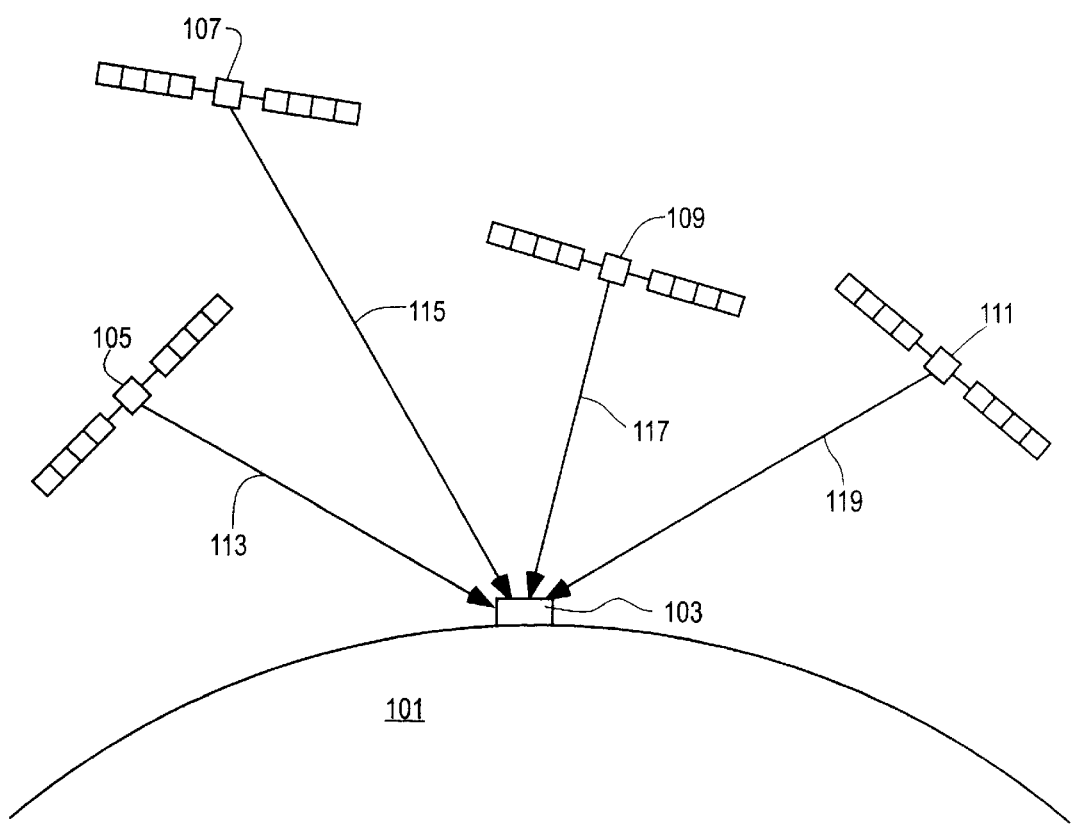
FIG. 1. is an illustration of a GPS receiver concurrently receiving signals from four GPS satellites.

FIG. 1 is an illustration of a GPS receiver 103 on earth 101 concurrently receiving signals from four GPS satellites 105, 107, 109, and 111 in space. The four GPS satellites 105, 107, 109 and 111 continually broadcast a high accuracy time signal which is received by GPS receiver 103. The signal from each of the GPS satellites 105, 107, 109, and 111 must respectively travel different paths 113, 115, 117 and 119. The time signal from each satellite is received includes the time that the time necessary for signals from the satellites need to travel the different paths to the receiver. The satellites also broadcast data about their position as well as a time signal. By knowing the positions of the satellites and using the time signals to compute the distance of the receiver from the satellites the receiver can accurately determine its position.

Figure 2:
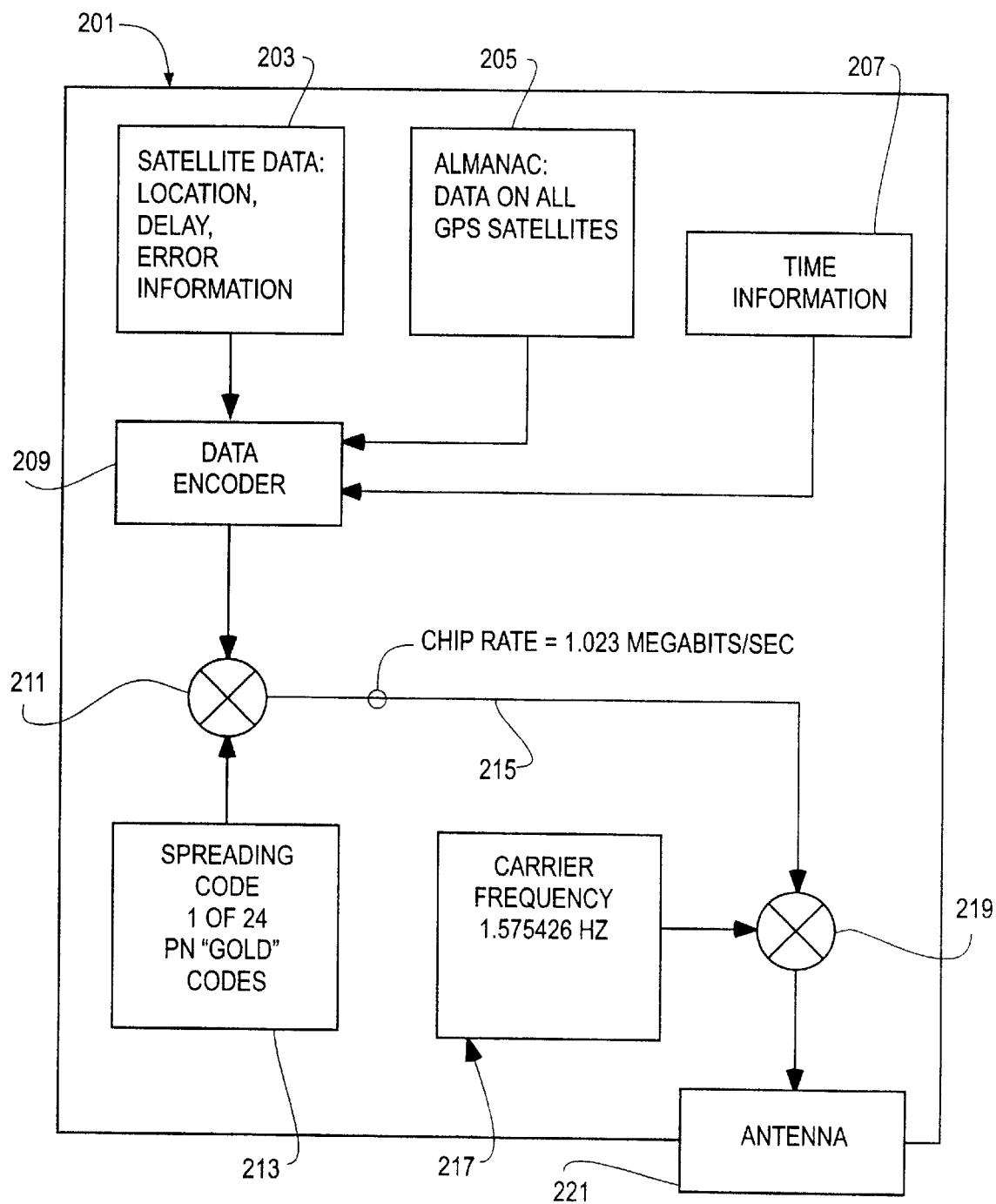
FIG. 2 a block diagram representation of a portion of a GPS satellite.

FIG. 2 is a block diagram of a portion of a GPS satellite 201 for spread spectrum encoding and the transmission of data. Block 203 represents satellite data that will be encoded for transmission. This data includes location information for the satellite, as well as delay and error information. Block 205 represents what is commonly referred to as almanac data, which is data on all of the GPS satellites. Block 207 represents the current time which is generated by the high accuracy atomic time standard within the satellite. The information from blocks 203, 205, and 207 are encoded in the proper format by the data encoder 209. The encoded data is then sent to the spreading unit 211, which multiplies the encoded data by one of 24 spreading codes, each code representing a particular satellite on orbit. The resulting data stream 215 has a chip rate of 1.023 megabits per second. The chip rate is the data rate (1000 bits per second) multiplied time the length of the spreading code (in this case 1023 bits). The data stream is then sent to the modulator 219 where the carrier frequency 1.57542 GHz is modulated by it. The resulting signal is sent to the antenna 221 of the satellite for broadcast.

FIG. 3 is a generalized block diagram representation of a receiving portion 300 of an example GPS receiver. The antenna 303 receive signals from one or more GPS satellites. The received signals are provided to a demodulator 305, which demodulates the signals using a carrier frequency, for example 1.57542 GHz, as represented by block 307. The resulting data signal 309 corresponds to the signal of the satellite data stream 215. The spread spectrum signal 309 is then despread in the correlator 311 using PN code 313. The data decoder 315 can then decode the data that would be needed to triangulate the position of the receiving unit.

FIG. 4 shows a tabular representation of a spectrum spreading and despreading, or correlating process illustrated with a spreading code of length 8. Three 8 bit spreading codes are illustrated. Spreading code 1, 401, is 11000011, Spreading code 2, 403, is 00110011, Spreading code 4, 401, is 10010110. To spread data using spreading code 1 for example, if a data "1" is to be sent, a copy of the code as in column 407, 11000011, is sent in its place. If a data "0" is to be sent, the inverse code, with each bit inverted, as shown in column 409, 00111100 is sent in its place. In other words if spreading code 1 is used and data representing a "1" is to be sent then the code 11000011 is sent. Similarly data representing a "0" would be sent as code 00111100.

The despreading process involves a mathematical manipulation, i.e. correlation with the received data. For example if data is to be received from a sender who is using spreading code 1 in order to despread the data all the "0"s of the received code are replaced by −1 for computational purposes, therefore if 11000011 (code 1's representation of a "1") is received it is replaced by 1 1−1−1−1−1 1 1 as shown in line 411. The received code is then multiplied bit by bit by the computational representation of the spreading code, i.e. 1 1−1−1−1−1 1 1 as shown in line 413. The bitwise product of the spreading code and the data received is shown in line 415 as 1+1+1+1+1+1+1+1=+8, the product of the correlation is +8 and thus a binary "1" is detected. If 00111100 (code 1's representation of a "0" as shown in column 409) is received it's replaced by −1−11 1 1−1−1 1 as shown in line 419. The received code is then multiplied bit by bit by the computational representation of the spreading code, i.e. 1 1−1−1−1−1 1 1, as shown in line 419. The bitwise product as shown in line 421 is −1−1−1−1−1−1−1−1= 8, the product of the correlation is −8 and a binary "0" is detected. If the signal had been correlated with the inverse of the spreading code, the product would have been a +8. The methods are equivalent and the selection can be made based on the particular implementation used.

The situation where the data transmitted by a signal spread with code 1 is despreaded by spreading code 2 is illustrated in lines 423, 425, and 427. As an example, a spreading code 1 data bit of "1", i.e. 11000011, is received. As shown in line 423 the 0 bits are replaced by −1 for computational purposes. Then the received code 11−1−1−1−1111 is multiplied bit by bit with the spreading code 2, e.g. −1−111−1−111 as shown in line 425. The product of multiplying a spreading code 1 data "1" with spreading code 2 is shown in line 427 as −1−1−1−1+1+1+1+1=0. That is, when a spreading code 1 representation of a data "1" is multiplied bit by bit and summed with spreading code 2, i.e. data spread with code 1 is correlated with code 3, the result is 0. In other words, no data is detected. Therefore, a transmission of a binary 1 using spreading code #1 will not interfere with data interpretation using spreading code 2.

The situation where the data transmitted by a signal spread with code 1 and despread using spreading code 3 is illustrated in lines 429, 431, and 433. As an example, a spreading code 1 data bit of "1", i.e. 11000011, is received. As shown in line 423 the 0 bits are replaced by −1 for computational purposes. Then the received code 11-1-1-1-111 is multiplied bit by bit with the spreading code 3, e.g. 1-1-11-111-1 as shown in line 431. The product of multiplying a spreading code 1 data "1" is shown in line 427 as 1-1+1-1+1-1+1-1=0. That is when a spreading code 1 representation of a data "1" is multiplied bit by bit and summed with spreading code 3, i.e. data spread with code 1 is correlated with code 3, the result is 0, in such case no data is detected. Therefore the transmission of a binary 1 using spreading code 1 will not interfere with data interpretation using spreading code 3.

The above examples illustrate that data transmitted with one code does not interfere with data transmitted with another code. This property, whereby transmission of data by one code does not mask the data transmitted by another code, is commonly referred to orthogonality, and codes having such properties are said to be orthogonal.

The previous illustrations were performed with a class of codes known as Walsh codes, which are perfectly orthogonal. The number of Walsh codes, however, is limited. The number of Walsh codes that exist is the number of bits in the spreading code. Because this situation is restrictive, a family of codes known as pseudo noise (PN) codes, which are nearly orthogonal, have been developed. PN codes are codes that repeat periodically and have the property that if they are multiplied by themselves and the bits summed the result is a number that is the same as the length of the sequence. That is under ideal conditions the correlation product of a PN code of length N with a signal containing that code will be the value N. For example the GPS PN code length is 1023, so that if the GPS signal is correlated with a code which is contained in the signal the output of the correlator will be 1023, if the signal is not present then the value will be −1.

PN codes also have the property that if they are correlated with the signal containing that particular PN code which is shifted in time by any number of bits then the result is a −1. This means that the correlation must be synchronized in time with the spread spectrum signal bearing the code in order to produce an output equal to the length of the code.

An advantage of a spread spectrum system is a greater toleration of noise mixed with a low power signal. Signals in a spread spectrum system can be very low and this can lead to difficulty in acquiring a signal, and identifying that the signal is present.

FIG. 5 is a block diagram of detailed representation of a preferred embodiment of an example GPS receiver. System 501 represents the decoding of signals from multiple satellites. The GPS receiver receives the satellite signals through its antenna 503. The demodulator 507 mixes the signal with the carrier frequency 505 and the resultant signal 508 is reduced to base band frequencies. The resultant signal 508 is a composite of all the satellite signals that the GPS receiver unit 501 can receive. To decode an individual satellites data stream the composite signal 508 must be correlated with the correct PN code. If the composite signal is correlated with an incorrect code, no data will be decoded. There are 32 PN codes that are designated by the GPS authority for use within the GPS system. Twenty four of these PN codes will be used by active satellites for the purpose of encoding their data. Each of the 24 active satellites in the GPS system has its own individual PN code.

A GPS receiver must extract data from several satellites in order to determine the position of the receiver, and it must extract the data from the satellites simultaneously. This situation is represented in the example embodiment shown in FIG. 5. In the embodiment shown the GPS receiver unit represented can extract data from 12 satellites simultaneously. Codes are obtained from the code table 517 which contains all 32 GPS PN spreading codes, sometimes these codes are referred to as GPS "gold" codes. PN code #1, 515, which has been obtained from the code table 517 is used in the correlator 509 to extract the data from the signal. The resulting data is then decoded in the data decoder 511. The output of the data decoder 511 contains information 513 from a first satellite, which can then be used to ascertain the distance of that first satellite from the receiver 501.

A second correlating and data decoding unit 519 is illustrated similar to the first 518. The second unit takes a second PN code 525 and multiplies it with the incoming signal in the correlator 521 to despread it. The data thus despread is decoded in the data decoder 523, the output of which 527 is used to ascertain a second distance of the satellite from the receiver 501. As will be explained later, the GPS receiver of FIG. 5 also includes various status circuitry, including temperature sensor 530, means for calculating an expected clock drift from the sensed temperature change 531, means for comparing the expected clock drift and actual clock drift experienced by the GPS receiver 532, signal-to-noise ratio determining circuit 533, and received signal strength detector 534. The outputs of these status circuits are processed toward determining whether the presence of a jamming signal is likely. Such processing may be performed by a general purpose microprocessor, digital signal processor, or specialized circuitry. Upon determining the likely presence of a jamming signal, various countermeasures can be implemented. For instance, a visual indication of the existence of a jamming signal may be provided. The GPS receiver may also be disabled until the jamming signal dissipates. In addition, an alternate approach to determining location may be implemented, 550.

In an ideal spread spectrum communications system all the signals would arrive at a receiver synchronously, that is with the signal transitions in all the received signals occurring at the same time. In that case we would have the situation shown in FIG. 6.

In FIG. 6 spread spectrum waveform 601, is synchronized with spread spectrum waveform 603. The waveform resulting from adding waveform 601 and 603 is waveform 605. If the resulting waveform 605, is sampled at times $t_0$, $t_1$, $t_2$, $t_3$, and $t_4$ the results are as shown in the table 607. That is waveform 605 is 0 at $t_0$, is 2 at $t_1$, is 1 at $t_2$, is 1 at $t_3$ and is 1 at $t_4$. These are the correct values for the addition of signals 601 and 603 and the correlators will have no trouble in interpreting these values. The situation where the spread spectrum signals synchronously arrive at a receiver is rare and the more common situation is as seen in FIG. 7.

In FIG. 7 spread spectrum waveform 701, is the exact same as spread spectrum waveform 601 of FIG. 6. In FIG. 7 spread spectrum waveform 705, is the exact same as spread spectrum waveform 603 of FIG. 6 except that it is delayed by a period $\Delta t_1$ so that the first rising edge of the waveform 705 is delayed from 703 to 707. Waveform 705 is the identical waveform to 603 otherwise. The addition of waveforms 701 and 705 produces waveform 709. If the resultant waveform 709 is sampled at times $t_0$, $t_1$, $t_2$, $t_3$, and $t_4$ the results are as shown in the table 715. That is waveform 709 is 0 at $t_0$, is 1 at $t_1$, is 2 at $t_2$, is 2 at $t_3$ and is 0 at $t_4$. This means that the waveform 709 if sampled at times $t_0$, $t_1$, $t_2$, $t_3$, and $t_4$, will provide different results than those obtained if waveform 605 is sampled at $t_0$, $t_1$, $t_2$, $t_3$, and $t_4$. This difference is solely due to the delay $\Delta t_1$ of signal 705.

However if waveform 709 is sampled at times s $t_{0A}$, $t_{1A}$, $t_{2A}$, $t_{3A}$, and $t_{4A}$ The results will be as in table 717, that is the same as the results in table 607, which is the correct sum of the 601 and 603 waveforms.

Figure 8:
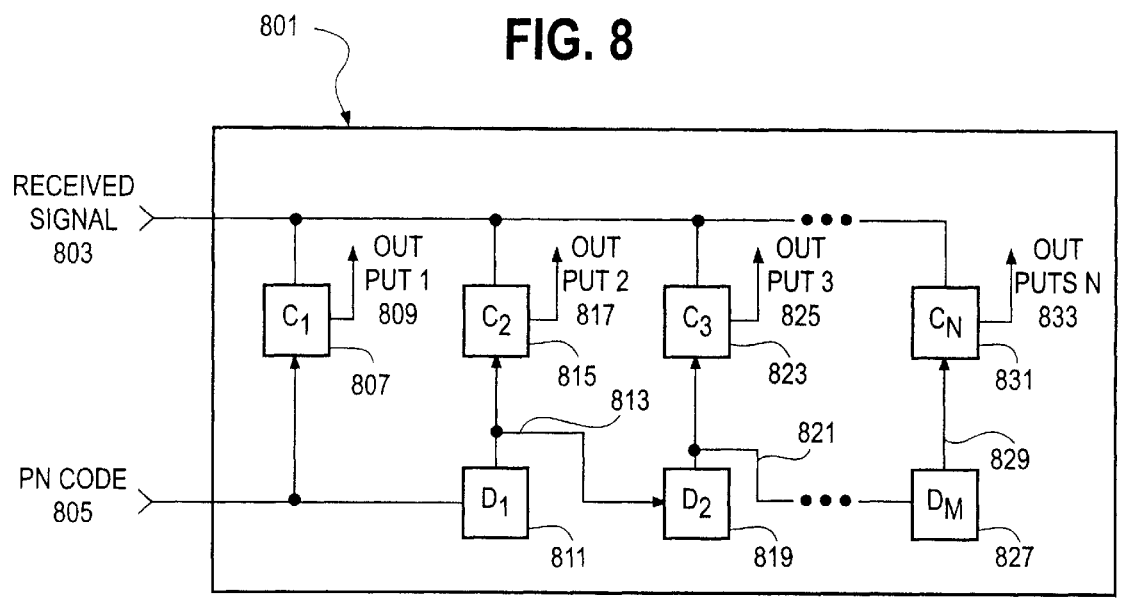
FIG. 8 is a block diagram of a string of correlator circuits of the type that is found within a preferred embodiment of the invention.

An example of a circuit for correcting the situation where the spread spectrum signals do not arrive simultaneously is shown in FIG. 8. In FIG. 8 the received signal 803 is correlated in correlator $C_1$, 807, to a PN code 805. The result of the correlation is output 1, 809. In addition the received signal 803 is correlated in correlator $C_2$, 815, to the PN code 805 which has been delayed in delay element $D_1$, 811. The delayed PN code 813 is then correlated with the received signal 803 with the in correlator $C_2$, 815 and the result is output 2, at 817. The PN code is then delayed a second time in delay element $D_2$, 819 and then correlated in correlator $C_3$, 823 the result is coupled to output 3, 825. The delayed PN code, 821 can be put through a number of additional delays $D_m$, 827, the delayed PN code can be then correlated in a number of additional correlators $C_n$, 831 and the results output in the additional outputs N, 823. One skilled in the art will recognize that the delay can be applied to either the received signal or the PN code with equivalent results. Equivalent outputs can be achieved and the delaying of one or the other, and the decision of which to delay is a implementation detail.

The expected delay between spread spectrum signals arriving at a GPS receiver can come from several sources. A primary source of delay between signals is the fact that in a GPS receiver the signals come from satellites that are different distances from the receiver. Since the satellites are moving the amount of delay between the signals can be constantly changing. The GPS receiver determines the position of the satellites, which is encoded in their signals, and as a consequence the GPS receiver can calculate the delay between signals and how much of a delay will be needed in the multiple correlating mechanism of FIG. 8 in order to extract the signal.

If the delay does not match the expectation of the GPS system several factors can be responsible. A first factor that might be present is that the unit may have a temperature change and the clock crystal within the unit can be drifting. The crystals supplied with typical GPS units can drift with temperature. A method of addressing this drift is to provide a temperature sensor in the GPS unit to ascertain whether the temperature of the crystal has changed and a clock drift is to be expected. If the drift due to temperature change is known, appropriate corrections can be applied. A second factor that can be responsible for the drift is that the receiver unit may have moved and so the unexpected delay needed to properly correlate the signal may be due to the receiver's new position with respect to the satellite.

When the delay between received signals changes so that the signal is no longer being properly decoded, the output of the correlator drops. The GPS system may then adjust the delay until the correlator output rises to an expected value indicating that the PN code is in synchronism with the signal, or if a scheme such as illustrated in FIG. 8 is used the output can be taken from a correlator either further up or further down the delay chain. If the delay is more than expected, the GPS receiver may interpret the additional delay to a change in receiver position, i.e. a velocity.

This mechanism by which the receiver compares the expected delay and the actual delay needed can be an effective method in ascertaining the speed at which the GPS receiver is traveling. As the correlator value begins to drop the GPS system can advance or retard the delay of the PN code (or the incoming signal if the GPS receiver is implemented in that manner) until the value seen out of the correlator increases to either its expected value (1023 in a 100% correlated GPS signal), or some intermediate value. A correlation with a PN code that is not present, or a PN code that is delayed so that it is no longer synchronous with the code within the signal will give a value of −1 from a correlator, and in a normally operating delay chain as in FIG. 8, the majority of the correlators can have a low (i.e. −1 or near −1 but substantially less than 1023) output. A means for detecting the outputs of the various correlators, 802, is shown. This circuit may indicate—by way of a sudden change in the output of the "synchronized" and "unsynchronized" correlators the presence of the jamming signal.

A jamming signal is a spurious signal that disrupts another signal, making it difficult or even impossible to interpret the original signal especially if the jamming signal is strong. Jamming is a common phenomenon. Spurious signals abound from many sources, high frequency digital circuits can generate spurious noise, electric motors can generate a great amount of wide spectrum noise as they make and break contacts, car ignition systems can broadcast noise, even natural phenomenon such as lightning can be responsible for generating a jamming signal.

In addition to these sources of noise, GPS receivers are particularly susceptible to noise generated by mobile GSM telephones. The side bands of these phones can fall within the frequency range in which the GPS system operates and can frequently deliver spurious energy on frequencies which can interfere with the reception of GPS signals.

In addition the GPS transmitters are of such low energy (50 watts maximum on the current GPS satellites) that even a fairly low energy jamming signal at the right frequency can disrupt the operation of a GPS receiver.

The presence of a jamming signal in a GPS receiver can have detrimental effects beyond merely disrupting of the current positioning information. It can introduce errors into the system that will not immediately disappear upon cessation of the jamming signal. For instance, as an example, assume that the GPS receiver is in a state where two signals are perfectly synchronized as in FIG. 6 with signals 601 and 603. A jamming signal then interrupts signal 603. The GPS receiver then begins to change the sampling of the signal. The signal was originally sampled at times $t_0$, $t_1$, $t_2$, $t_3$, and $t_4$. The delay between the signals increases to the point where the situation is as shown in FIG. 7. The actual delay between the signals is a $\Delta t_1$ as shown in FIG. 7, and the leading edge of signal 705 has moved from where it was, 703, when the jamming started to 707 a distance of $\Delta t_1$. The GPS system however has continued to adjust the delay at which it samples the signal 705 in an effort to acquire the signal. When the delay has been adjusted to $\Delta t_2$ (611) and the receiver is sampling the signal at times $t_{0B}$, $t_{1B}$, $t_{2B}$, $t_{3B}$, and $t_{4B}$ the jamming ceases and the GPS system has acquired the signal. Only an adjustment of $\Delta t_3$ is actually necessary to resynchronize the signal and so the output would still be correct if the signal were sampled at $t_{0A}$, $t_{1A}$, $t_{2A}$, $t_{3A}$, and $t_{4A}$. The GPS system however has added a delay of $\Delta t_2$ and, by sampling at $t_{0B}$, $t_{1B}$, $t_{2B}$, $t_{3B}$, and $t_{4B}$, the GPS system has reacquired the signal after an adjustment of $\Delta t_2$. As seen in table 719 the outputs are now correct and are in fact the same as those of table 717, where the signal was sampled with a delay of $\Delta t_3$ instead of the longer $\Delta t_2$. The GPS system has increased the delay more than necessary to achieve the resynchronization. Because the GPS system now has erroneously determined that a delay of $\Delta t_2$ is necessary to acquire the signal, it now computes a new position which is based on that delay. This situation may continue for a long period of time, it may continue even after the satellite providing the signal 705 is no longer being received.

Another scenario can be envisioned by reference to FIG. 8. Assume that correlator $C_1$, 807, is producing an output of −1 and correlator $C_2$, 815, is producing an output of 1023. The jamming signal then interrupts and the output of correlator $C_2$, 815, drops, before the normal time that it would drop given the natural movement of the satellites. The GPS system interprets this as a velocity and begins searching for the correct correlator further down the chain. The system continually tries to reacquire the signal and searches successive correlators, adding the expected delay to satellite movement to the velocity that it thinks it is seeing. This error can continue to build. In GPS receivers employing Kalman filtering this type of error will accumulate and even after the jamming ceases, and the error will persist for a time period while the erroneous readings gradually dissipates.

Figure 9:
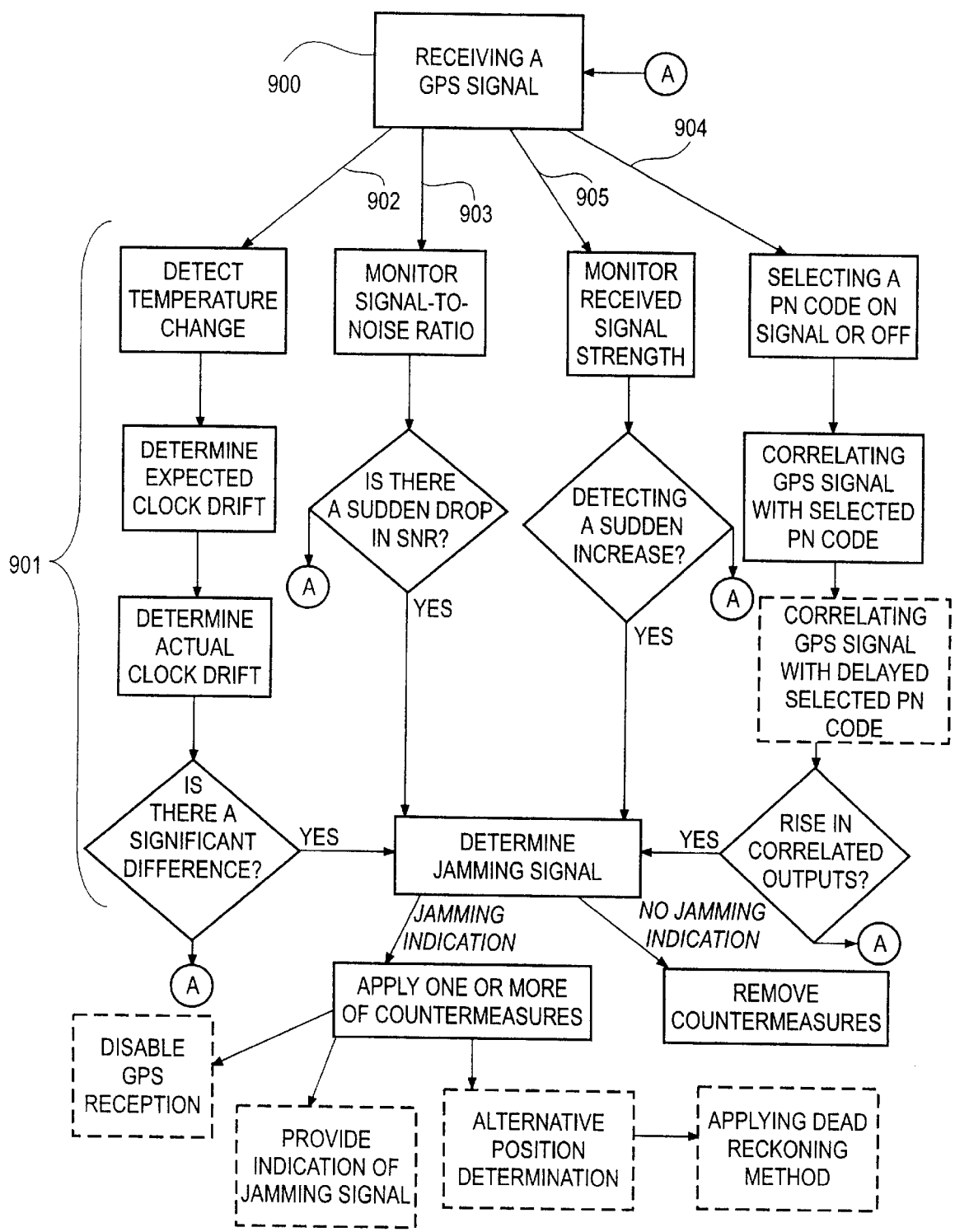
FIG. 9 of the drawings is a flow diagram of a method of minimizing error within a GPS receiver caused by the presence of a jamming signal.

Therefore, there is a need in the art of detecting jamming signals and dealing with the results of the presence of jamming signals in order to improve the performance of GPS receivers. FIG. 9 of the drawings shows the present inventive approach to such jamming signal detection and minimization of resultant error.

After receiving a GPS signal (step 900), a first step toward avoiding adverse effects of jamming is to detect the presence of a jamming signal, 901. There are several indications that a jamming signal is present.

One of the ways that jamming can be detected is to detect a high rate of clock drift without a corresponding change in temperature, branch 902. If the GPS receiver must increase the delay used to decode all its signals, then we have a situation where the clock drift is high. If there is a corresponding change in temperature, the drift can be due to the unit's changed temperature. However, if a drift that is high with little temperature change or a clock drift that experiences a sudden jump can be indictors of the presence of a jamming signal. Thus the detection of those events may effect a detection of a jamming signal.

Another way to detect jamming is to examine the signal to noise ratio of the incoming GPS signal, branch 903. If this ratio quickly drops by greater than a pre-established amount, for example 3 dB, it is an indication that a jamming signal is present, because there is a large sudden increase in noise.

A third way to detect jamming is by using a mechanism such as the correlator chain in FIG. 8, branch 904. If a signal is being received by the chain and the correct PN code is being used to decode it, the expected output of the correlators will be −1 where the code is not synchronized with the incoming GPS signal. When the delay in the chain is correct to decode the signal, the output of the correlators will increase and in the case where the signal matches the code and the signal is strong enough the output will be 1023. After that point in the chain the correlator output will again decrease to −1. How many correlators will show a correlation output of greater than −1 will depend on several factors. It will depend on the total number of correlators, the strength of the signal, and the amount of delay between stages of the correlator chain.

In the presence of jamming however, the value of all the correlators in the chain which had low values indicating no correlation signal will rise, and the values of those that showed good correlation, i.e. high output, will fall. This situation may be difficult to detect though because the GPS signal can constantly change due to changes in position, cover, and obstacles coming in and out of the signal path.

Another way to detect the presence of jamming using a correlator chain is to correlate the incoming signal with a PN code not being received by the GPS receiver. The code may be one that is not one of the designated 32 GPS codes, it may be the $25^{th}$ GPS code which is guaranteed by the GPS authority not to be used in a GPS satellite, or it may be a code of one of the satellites that is not in a position to be received by the GPS system. Because each satellite delivers as part of its data an almanac containing information on the positions of all the satellites in the system, the GPS system can select a satellite that is not within its reception range, and use its PN code. Under non jamming conditions with adequate signal strength all the correlators in this chain in which the non received PN code is present will show a low value (−1 if the signal strength is adequate). When jamming is present all correlators in the chain will show a higher output. The more correlators that exhibit this rise in value, the more likely it is that jamming is present. Therefore, if the correlator chain has a large number of correlators (such as correlator 100) in the chain and the outputs of all the correlators rise, it will be more likely that a jamming signal is present than if there are just 3 correlators in the chain and the values rise. However, even with a minimal number of correlators, or even one, when there is this type of rise in output of the correlators it is an indication that jamming may be present.

There are other ways to detect jamming, such as monitoring the signal strength of the signal being received with signal strength indicators well known in the art, branch 905. A sudden increase in signal strength or a indication that the signal strength at the GPS frequency is higher than can be accounted for by GPS signals will also indicate a spurious signal and a source of jamming.

Of course the methods of detecting jamming may be combined and in general having two or more indications of jamming is a greater indication that a jamming signal exists than only one. Those skilled in the art will recognize that combinations and variations of the above embodiments are possible, they will also recognize that the principles demonstrated in the above embodiments can be used in a variety of ways to accomplish the purpose without departing from the inventive concepts within this disclosure.

If jamming is detected, there are countermeasures which may be taken. A simple countermeasure is to simply shut the GPS system off until the jamming signal is no longer present. In this manner no erroneous jumps in position or erroneous velocities are seen, and no errors can be built up. The display of the unit can provide a message indicating that a jamming signal has been detected and may indicate what the last valid position was. It may also indicate simply that no valid position is available.

Figure 10:
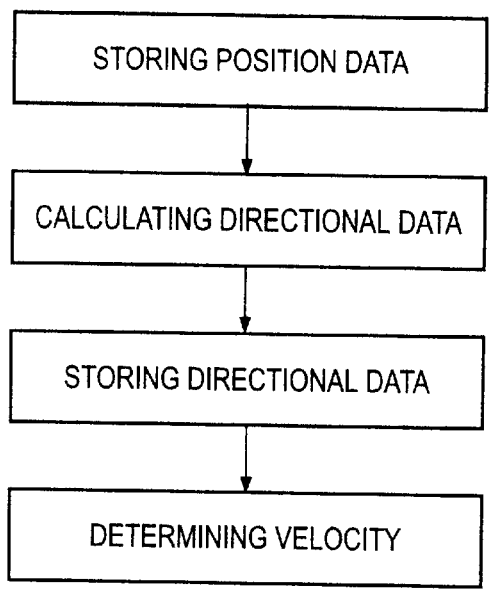
FIG. 10 of the drawings is a flow diagram of a dead reckoning method.
Figure 11:
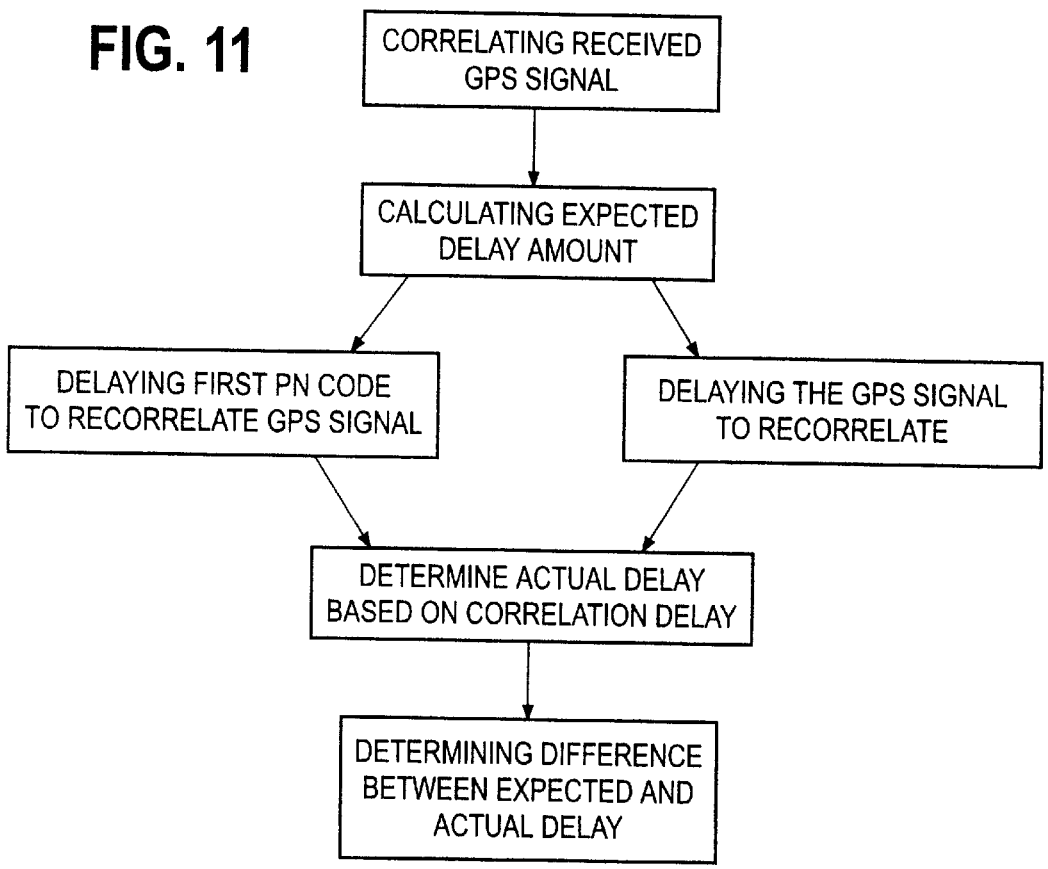
FIG. 11 of the drawings is a flow diagram of methods for determining velocity of the GPS receiver.

The GPS unit may also utilize a dead reckoning mode (see FIG. 10) in which a position which is a product of the last known valid position, the last known direction traveled and the last known velocity is displayed. Velocity can be determined using the methods discussed above, which may be understood further with reference to FIG. 11.

In more elaborate implementations the GPS unit may revert to other navigation systems built into the unit.

Those skilled in the art will recognize that various jamming countermeasures may be applied depending on the application in which the GPS receiver is embedded. For example a vehicle might fall back on the last known valid GPS position and a compass reading and speed indication, an airplane might fall back on navigational beacons. The types of countermeasures that can be applied are numerous and many variations are possible without departing from the spirit of the invention and the inventive concepts herein.

I claim:

1. A method of minimizing the error within a GPS receiver in the presence of a jamming signal the method comprising:

receiving a GPS signal in conjunction with a jamming signal;

detecting the jamming signal using at least one detection scheme selected from the group of detection schemes consisting of:
  (a) detecting a temperature change within the GPS receiver, determining an expected clock drift from the temperature change detected within the GPS receiver, determining an actual clock drift of the GPS receiver within the GPS receiver, and observing a difference between the expected clock drift and the actual clock drift of the GPS receiver whereby the presence of the jamming signal is detected;
  (b) monitoring a signal to noise ratio for the received GPS signal, and detecting a sudden drop in the signal to noise ratio whereby the presence of the jamming signal is detected;
  (c) monitoring a signal strength value of the received GPS signal at the GPS frequency, and detecting a sudden increase in the signal strength value of the received GPS signal at the GPS frequency whereby the presence of the jamming signal is detected;
  (d) correlating the received GPS signal with a first PN code in a first correlator, wherein the first correlator output indicates that the first PN code is present in the received GPS signal, correlating the received GPS signal with a delayed version of the first PN code in a second correlator wherein the delay is sufficient so that the second correlator output indicates that the delayed PN code is not present in the received GPS signal, and monitoring the output of the first correlator for a drop in output value which coincides with an increase in the output of the second correlator whereby the presence of the jamming signal is detected;
  (e) selecting a PN code not contained within the received GPS signal, correlating the received GPS signal with the selected PN code, and detecting a rise in the correlated output whereby the presence of the jamming signal is detected; and
  (f) selecting a plurality of PN codes not contained within the received GPS signal, correlating the received GPS signal in a plurality of correlators with the plurality of selected PN codes, and detecting a rise in the correlated output of the plurality of correlators, whereby the presence of the jamming signal is detected; and applying a countermeasure whereby the error induced into the GPS receiver by the jamming signal is reduced.

2. The method as in claim 1 wherein detecting the jamming signal comprises:

correlating the received GPS signal in a plurality of correlators with successively delayed versions of the selected PN code; and detecting a rise in the correlated output of the plurality of correlators, whereby the presence of the jamming signal is detected.

3. The method of claim 1 wherein the selected PN code is a GPS code from a GPS satellite not being received by the GPS receiver.

4. The method of claim 3 wherein the selected GPS code is the 25th GPS code, guaranteed by the GPS authority not to be present in any GPS satellite.

5. The method as in claim 1 wherein applying countermeasures comprises:

disabling the output of the GPS receiver.

6. The method as in claim 5 wherein applying countermeasures comprises:

applying a dead reckoning method of position determination while the jamming signal is present.

7. The method as in claim 5 wherein applying countermeasures comprises:

providing an indication of the presence of the jamming signal.

8. The method as in claim 5 wherein applying countermeasures comprises:

defaulting to a backup method of position determination.

9. The method as in claim 5 wherein the GPS receiver is disabled only while the jamming signal is detected.

10. The method as in claim 6 wherein the application of the dead reckoning method includes:

storing position data determined from a plurality of received GPS signals in the GPS receiver while the jamming signal is not detected;

calculating directional data from changes in the position data while the jamming signal is not detected, storing the directional data in the GPS receiver; and determining the velocity at which the GPS receiver is travelling.

11. The method as in claim 10 wherein the velocity is determined by:

correlating the received GPS signal with a first PN code in a first correlator, wherein the first correlator output indicates that the first PN code is present in the received GPS signal;

calculating an expected delay amount delaying the first PN code upon detecting a drop in the first correlator output by an actual delay amount which changes until the first correlator output reaches a desired value; and determining the difference between the expected and actual delay amount.

12. The method as in claim 10 wherein the velocity is determined by:

correlating the received GPS signal with a first PN code in a first correlator, wherein the first correlator output indicates that the first PN code is present in the received GPS signal;

calculating an expected delay amount;

delaying the received GPS signal upon detecting a drop in the first correlator output by an actual delay amount which changes until the first correlator output reaches a desired valued; and determining the difference between the expected and actual delay amount.

13. The method as in claim 1 wherein detecting the jamming signal further comprises:

detecting a sudden drop in a signal to noise ratio for the received GPS signal; and deciding that the presence of the jamming signal is indicated based only on substantial coincidence of the sudden drop in the signal to noise ratio and the observation of a difference between the expected and actual clock drift.

14. The method as in claim 13 wherein detecting the jamming signal further comprises:

detecting a sudden increase in a signal strength value of the received GPS signal at the GPS frequency; and deciding that the presence of the jamming signal is indicated based only on substantial coincidence of at least two conditions selected from the group of the sudden drop in the signal to noise ratio, the observation of a difference between the expected and actual clock drift and the sudden increase in the signal strength value of the received GPS signal.

15. The method as in claim 14 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of at least two conditions selected from the group of the sudden drop in the signal to noise ratio, the observation of a difference between the expected and actual clock drift, the sudden increase in the signal strength value of the received GPS signal and a coincident reversal in the first and second correlator outputs.

16. The method as in claim 15 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the sudden drop in the signal to noise ratio, the observation of a difference between the expected and actual clock drift, the sudden increase in the signal strength value of the received GPS signal, a coincident reversal in the first and second correlator outputs and the rise in the third correlator output.

17. The method as in claim 15 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the sudden drop in the signal to noise ratio, the observation of a difference between the expected and actual clock drift, the sudden increase in the signal strength value of the received GPS signal, a coincident reversal in the first and second correlator outputs and the rise in the plurality of third correlator outputs.

18. The method as in claim 15 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from The group of the sudden drop in the signal to noise ratio, the observation of a difference between the expected and actual clock drift, the sudden increase in the signal strength value of the received GPS signal, a coincident reversal in the first and second correlator outputs and the rise in the plurality of third correlator outputs.

19. The method as in claim 1 wherein detecting the jamming signal further comprises:

detecting a sudden increase in a signal strength value of the received GPS signal at the GPS frequency; and deciding that the presence of the jamming signal is indicated based only on substantial coincidence of the observation of a difference between the expected and actual clock drift and the sudden increase in the signal strength value of the received GPS signal.

20. The method as in claim 19 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of at least two conditions selected from the group of the observation of a difference between the expected and actual clock drift, the sudden increase in the signal strength value of the received GPS signal and a coincident reversal in the first and second correlator outputs.

21. The method as in claim 20 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the observation of a difference between the expected and actual clock drift, the sudden increase in the signal strength value of the received GPS signal, a coincident reversal in the first and second correlator outputs and the rise in the third correlator output.

22. The method as in claim 21 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the observation of a difference between the expected and actual clock drift, the sudden increase in the signal strength value of the received GPS signal, a coincident reversal in the first and second correlator outputs and the rise in the plurality of third correlator outputs.

23. The method as in claim 21 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from the group of the observation of a difference between the expected and actual clock drift, the sudden increase in the signal strength value of the received GPS signal, a coincident reversal in the first and second correlator outputs and the rise in the plurality of third correlator outputs.

24. The method as in claim 1 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of the observation of a difference between the expected and actual clock drift and a coincident reversal in the first and second correlator outputs.

25. The method as in claim 24 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the observation of a difference between the expected and actual clock drift, a coincident reversal in the first and second correlator outputs and the rise in the third correlator output.

26. The method as in claim 25 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the observation of a difference between the expected and actual clock drift, a coincident reversal in the first and second correlator outputs and the rise in the plurality of third correlator outputs.

27. The method as in claim 25 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from the group of the observation of a difference between the expected and actual clock drift, a coincident reversal in the first and second correlator outputs and the rise in the plurality of third correlator outputs.

28. The method as in claim 1 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of the observation of a difference between the expected and actual clock drift and the rise in the third correlator output.

29. The method as in claim 28 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of the observation of a difference between the expected and actual clock drift and the rise in the plurality of third correlator outputs.

30. The method as in claim 28 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of the observation of a difference between the expected and actual clock drift and the rise in the plurality of third correlator outputs.

31. The method as in claim 1 wherein detecting the jamming signal further comprises:

detecting a sudden increase in a signal strength value of the received GPS signal at the GPS frequency; and deciding that the presence of the jamming signal is indicated based only on substantial coincidence of the sudden drop in the signal to noise ratio and the sudden increase in the signal strength value of the received GPS signal.

32. The method as in claim 31 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of at least two conditions selected from the group of the sudden drop in the signal to noise ratio, the sudden increase in the signal strength value of the received GPS signal and a coincident reversal in the first and second correlator outputs.

33. The method as in claim 32 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the sudden drop in the signal to noise ratio, the sudden increase in the signal strength value of the received GPS signal, a coincident reversal in the first and second correlator outputs and The rise in the third correlator output.

34. The method as in claim 32 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the sudden drop in the signal to noise ratio, the sudden increase in the signal strength value of the received GPS signal, a coincident reversal in the first and second correlator outputs and the rise in the plurality of third correlator outputs.

35. The method as in claim 32 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from the group of the sudden drop in the signal to noise ratio, the sudden increase in the signal strength value of the received GPS signal, a coincident reversal in the first and second correlator outputs and the rise in the plurality of third correlator outputs.

36. The method as in claim 1 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of the sudden drop in the signal to noise ratio and a coincident reversal in the first and second correlator outputs.

37. The method as in claim 36 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the sudden drop in the signal to noise ratio, a coincident reversal in the first and second correlator outputs and the rise in the third correlator output.

38. The method as in claim 36 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the sudden drop in the signal to noise ratio, a coincident reversal in the first and second correlator outputs and the rise in the plurality of third correlator outputs.

39. The method as in claim 36 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from the group of the sudden drop in the signal to noise ratio, a coincident reversal in the first and second correlator outputs and the rise in the plurality of third correlator outputs.

40. The method as in claim 1 wherein detecting the jamming signal further comprises:

correlating the received GPS signal with a first PN code in a first correlator, wherein the first correlator output indicates that the first PN code is present in the received GPS signal;

correlating the received GPS signal with a delayed version of the first PN code in a second correlator wherein the delay is sufficient so that the second correlator output indicates that the delayed PN code is not present in the received GPS signal; and monitoring the output of the first correlator for a drop in output value which coincides with an increase in the output of the second correlator; and deciding that the presence of the jamming signal is indicated based only on substantial coincidence of the sudden drop in the signal to noise ratio and a coincident reversal in the first and second correlator outputs.

41. The method as in claim 40 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of at least two conditions selected from the group of the sudden drop in the signal to noise ratio, a coincident reversal in the first and second correlator outputs and the rise in the third correlator output.

42. The method as in claim 41 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of at least two conditions selected from the group of the sudden drop in the signal to noise ratio, a coincident reversal in the first and second correlator outputs and the rise in the plurality of third correlator outputs.

43. The method as in claim 41 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of at least two conditions selected from the group of the sudden drop in the signal to noise ratio, a coincident reversal in the first and second correlator outputs and the rise in the plurality of third correlator outputs.

44. The method as in 1 wherein detecting the jamming signal further comprises:

selecting a PN code not contained within the received GPS signal;

correlating the received GPS signal with the selected PN code in a third correlator; and detecting a rise in the correlated output of the third correlator;

deciding that the presence of the jamming signal is indicated based only on substantial coincidence of the observation of the sudden drop in the signal to noise ratio and the rise in the third correlator output.

45. The method as in claim 44 wherein detecting the jamming signal further comprises:

selecting a PN code not contained within the received GPS signal;

correlating the received GPS signal in a plurality of third correlators with successively delayed versions of the selected PN code; and detecting a rise in the correlated output of the plurality of third correlators;

deciding that the presence of the jamming signal is indicated based only on substantial coincidence of the observation of the sudden drop in the signal to noise ratio and the rise in the plurality of third correlator outputs.

46. The method as in claim 44 wherein detecting the jamming signal further comprises:

selecting a plurality of PN codes not contained within the received GPS signal;

correlating the received GPS signal in a plurality of third correlators with the plurality of selected PN codes; and detecting a rise in the correlated output of the plurality of third correlators;

deciding that the presence of the jamming signal is indicated based only on substantial coincidence of the observation of the sudden drop in the signal to noise ratio and the rise in the plurality of third correlator outputs.

47. A computer data signal embodied in a carrier wave comprising a method of minimizing the error within a GPS receiver in the presence of a jamming signal the method comprising:

receiving a GPS signal at a GPS frequency, the GPS signal having a jamming signal potentially associated therewith;

detecting the jamming signal using at least one detection scheme selected from the group of detection schemes consisting of:
  (a) detecting a temperature change within the GPS receiver, determining an expected clock drift from the temperature change detected within the GPS receiver, determining an actual clock drift of the GPS receiver within the GPS receiver, and observing a difference between the expected clock drift and the actual clock drift of the GPS receiver whereby the presence of the jamming signal is detected;
  (b) monitoring a signal to noise ratio for the received GPS signal, and detecting a sudden drop in the signal to noise ratio whereby the presence of the jamming signal is detected;
  (c) monitoring a signal strength value of the received GPS signal at the GPS frequency, and detecting a sudden increase in the signal strength value of the received GPS signal at the GPS frequency whereby the presence of the jamming signal is detected;
  (d) correlating the received GPS signal with a first PN code in a first correlator, wherein the first correlator output indicates that the first PN code is present in the received GPS signal, correlating the received GPS signal with a delayed version of the first PN code in a second correlator wherein the delay is sufficient so that the second correlator output indicates that the delayed PN code is not present in the received GPS signal, and monitoring the output of the first correlator for a drop in output value which coincides with an increase in the output of the second correlator whereby the presence of the jamming signal is detected;
  (e) selecting a PN code not contained within the received GPS signal, correlating the received GPS signal with the selected PN code, and detecting a rise in the correlated output whereby the presence of the jamming signal is detected; and
  (f) selecting a plurality of PN codes not contained within the received GPS signal, correlating the received GPS signal in a plurality of correlators with the plurality of selected PN codes, and detecting a rise in the correlated output of the plurality of correlators, whereby the presence of the jamming signal is detected; and
applying a countermeasure whereby the error induced into the GPS receiver by the jamming signal is reduced.

48. An apparatus for minimizing the error within a GPS receiver in the presence of a jamming signal wherein the apparatus comprises:
  means for receiving a GPS signal at a GPS frequency, the GPS signal having a jamming signal potentially associated therewith;
  means for detecting the jamming signal, wherein the jamming signal detecting means is selected from the group consisting of:
    (a) a temperature sensor operably associated with the GPS receiver, a computational circuit operably connected to the temperature sensor for determining an expected clock drift due to the change in the temperature of the GPS receiver, a circuit for determining actual clock drift, and a comparator for comparing the actual clock drift to the expected clock drift to determine a difference, whereby the presence of the jamming signal can be detected based on the difference;
    (b) a circuit for determining the amount of signal present, a circuit for determining the amount of noise within the signal, a computational circuit for receiving the amount of signal present and for receiving the amount f noise present within the signal and determining signal to noise ratio, and a monitoring circuit coupled to the computational circuit for the purpose of receiving the signal to noise ratio and for detecting sudden changes in the signal to noise ratio for the purpose of detecting the presence of the jamming signal;
    (c) a signal strength detection circuit for monitoring the strength of the signal in the GPS transmission band and a comparator circuit coupled to the signal strength detection circuit to receive the strength of the signal in the GPS transmission band and to compare the strength of the signal in the GPS transmission band to an expected maximum value, for the purpose of detecting the presence of the jamming signal;
    (d) a first correlator, a PN code coupled to the first correlator whereby the presence of the PN code within the GPS signal is detected by a high output from the correlator, a second correlator, a delay circuit disposed between the PN code and the second correlator, for receiving the PN code and delaying the PN code prior to coupling it into the second correlator, whereby the delay is sufficient so that the delayed PN code is indicated, by a low output from the second correlator, as not being present, and a circuit for receiving the output of the first correlator and the second correlator for determining a drop in the value of the first correlator coincident with an increase in the output of the second correlator, whereby the presence of the presence of the jamming signal is detected;
    (e) a chain of one or more correlators coupled to receive the GPS signal and a respective one of successively delayed PN code, and whereby the output of the correlators of the chain exhibit a low value and a monitoring circuit coupled to the outputs of the correlators for the purpose of detecting a rise in the output values of the correlators, whereby the presence of the jamming signal is detected; and
    (f) a plurality of correlators coupled to receive the GPS signal and different PN codes, whereby the output of the correlators exhibit a low value and a monitoring circuit coupled to the outputs of the correlators for the purpose of detecting a rise in the output values of the correlators, whereby the presence of the jamming signal is detected; and
  means for applying jamming signal countermeasures toward reducing the error induced in the GPS receiver upon detecting the jamming signal.

49. The apparatus as in claim 48 wherein the countermeasure means comprises:
  a circuit for receiving in indication that the jamming signal is present whereby the circuit disables the output of GPS receiver.

50. The apparatus as in claim 48 wherein the countermeasure means comprises:
  a circuit for receiving an indication that the jamming signal is present whereby the circuit disables the output of GPS receiver upon receiving an indication that a jamming signal is present; and
  a circuit for applying dead reckoning as a means of updating the position of the GPS receiver upon receiving an indication that the jamming signal is present.

51. The apparatus as in claim 48 wherein the countermeasure means comprises.

a circuit for receiving an indication that the jamming signal is present whereby the circuit disables the GPS receiver upon receiving an indication that the jamming signal is present; and a circuit for defaulting to a backup position determination system for the purpose of updating the position of the GPS receiver upon receiving an indication that the jamming signal is present.

* * * * *